3,364,167
METHOD OF MANUFACTURING COLORLESS OR COLORED MELAMINE MODIFIED PHENOLIC RESINS
Shimesu Imai, Hideharu Kitahama, Yasuo Kikuchi, Yoshifumi Iwata, Osamu Yamada, and Yoshio Mizutani, Gifu-ken, Japan, assignors to Ibigawa Electric Industry Co., Ltd., Gifu-ken, Japan, a corporation of Japan
No Drawing. Filed Dec. 26, 1963, Ser. No. 333,712
Claims priority, application Japan, Feb. 7, 1963, 38/4,776; July 29, 1963, 38/37,680, 38/37,681, 38/37,682, 38/37,683
6 Claims. (Cl. 260—30.8)

This invention relates to a method for manufacturing substantially colorless melamine modified phenolic resins which can be freely colored by dyes or pigments.

There are two types of phenolic resins produced by the condensation of phenols, such as phenol, xylenol, alkylphenol and bisphenol, and mixtures thereof, and formaldehyde, namely the novolak resins and resol resins. Both types are usually colored yellow or reddish brown and the color has a tendency to deepen in the presence of light or air. The same is also true of melamine modified phenolic resins. The self-coloring of these resins renders the deliberate coloring of them by the addition of dyes or pigments difficult to control and to reproduce accurately and represents one of the greatest defects of these phenolic resins.

We have now found that substantially colorless melamine modified phenolic resins can be obtained by controlling the pH of the reaction mixture within certain limits by the use, as the pH controlling agent, of certain colorless metal compounds which contain no ammonium or amino group, such as caustic soda or magnesia, instead of the ammonium compounds usually used.

The features of this invention reside in a method for manufacturing substantially colorless melamine modified phenolic resins by addition condensation of three components of phenols, melamine and aldehydes, wherein pH of reacting system is controlled by colorless metal compounds having neither ammonium nor amino group and pH of the system after addition of phenols is maintained in a range of 5 to 8 until the reaction concludes.

Melamine modified phenolic resins produced by this invention are substantially colorless before and even after completion of curing and coloring of them is freely attained by mixing dyes and pigments into the body of resin.

As with conventional melamine modified phenolic resins, the properties of the resins, such as alkali resistance, electric arc resistance, hardness and the like can be varied by changing the ratio of melamine to phenols appropriately.

In this invention usage of colorless metal compounds excluding ammonium or amino group as pH controlling reagent is one of the important matters and usage of ammonium or amine series compound such as ammonia, hexamethylene or triethanolamine which is usually used for manufacturing phenolic resins results in a yellowish colored resin, even if the pH is controlled in the range described in this invention. But usage of the aforesaid colorless metal compounds provides substantially colorless resins. These metal compounds are selected from a group consisting of alkali compounds such as NaOH, KOH, $Na_2CO_3$, $K_2CO_3$, and metal oxides or hydroxides such as $Ca(OH)_2$, ZnO, $Mg(OH)_2$, $Mn(OH)_2$, $TiO_2$. These colorless metal compounds or metals can be used alone or as mixtures.

It is the most important feature of this invention that the reaction mixture comprising one or more phenols, melamine and aldehydes is maintained in the pH range of 5 to 8 after addition of phenols to the system. Even if colorless metal compounds are used as pH controlling reagents, in the case that pH of reacting system including phenols exceeds pH 8, the resins produced are colored reddish brown in the reaction time, and degree of coloring increases as the pH of the system increases. Therefore, it is impossible to obtain substantially colorless resins if the pH of the reacting system exceeds 8 after addition of phenols. That is because melamine which has a restraining effect on the coloring of phenols is probably ineffective when the pH of said system exceeds 8. When the pH of the reacting system is too low, a condensation reaction occurs vigorously not like the case without melamine and sometimes gelation occurs, though coloring of resins can be avoided. If the pH of said system is higher than 5, the reaction proceeds smoothly and the so-called pot life of the resin syrup is long and pre-condensated resins which have good moldability and do not overcondensate can be obtained by drying after impregnation of the syrup on papers for laminates or on α-cellulose pulp for molding composition.

The amount of melamine required for obtaining substantially colorless melamine modified phenolic resins is larger than a 0.15 mol ratio to phenols. When said ratio is less than 0.15, it is difficult to obtain substantially colorless resins. This is probably because the color restraining effect of melamine is extremely reduced owing to the small ratio of melamine to phenols.

The mixing ratio of melamine to phenols can be changed according to the properties required for produced resins. As the ratio of melamine to phenols increases, the resin produced has increasingly the nature of melamine resin. When the mol ratio of phenols and melamine is between 1:1 to 2:1, the merits of melamine resins appear as well as phenolic resins most strongly.

Use of curing catalyst for melamine resins is preferable when a large amount of melamine is used compared to that of phenols, because the curing rate becomes faster.

For industrial purpose, formaline or paraform is most usual as the source of aldehydes. Ratio of aldehyde to phenols and melamine is selected according to the purpose of the resin produced, for instance, molding composition, laminate, adhesive or coating material.

Several ways of reacting the three components, phenols, melamine and aldehydes, are possible when colorless metal compounds are used as pH controlling reagents and the pH of the reacting system containing phenols is maintained between 5 to 8. One method is mixing these three components at the same time followed by heating and reaction. Another method is that the reaction is completed after phenols are added to the reaction products of melamine and formalin, or that reaction of melamine, phenols and a portion of formalin takes place at first and the reaction proceeds further after addition of the remaining formalin. But when there is the addition of melamine after phenols and aldehydes, these then react considerably, discoloring of the resins produced sometimes occurs in the period of curing or after curing. Therefore, reaction of phenols and aldehydes in the absence of melamine must be avoided.

Where a colored resin is required, any suitable dyes or pigments can be added to the resin at any stage in the process.

When these resins are used as molding or laminating materials, good flow is often required at molding step. For this purpose we tried to use several known plasticizers for phenolic resins, such as dioctyl phthalate, dibutyl phthalate and tricresyl phosphate, and observed that these plasticizers are undesirable because they have little compatibility with the resins obtained according to the present invention or they cause remarkable discoloration of the resins. We have surprisingly discovered after further investigation that benzene sulphonamide o- and p-toluene sulphonamide are effective plasticizers for the present resins and cause no substantial discoloration of the resin, although these plasticizers cause a yellowish coloration of conventional phenolic resins.

These plasticizers may be added at any step in the process of the present invention. Benzene sulphonamide, o-toluene sulphonamide, p-toluene sulphonamide or mixtures thereof can be added to the starting materials or to the reaction mixture or to the resins before they are mixed with fillers. It is preferred to add the plasticizers and formaldehyde at the same time to the reaction mixture or to add these plasticizers at the pulverization step in the manufacture of molding compositions.

When these resins are used in molding compositions, laminates or adhesives, a fast curing rate is often desirable. The curing rate of the resins can be made faster by reducing the pH of the reaction mixture, but this procedure has its limitations because it tends to reduce the so-called pot life of the resin syrup and tends to lead to poorer flow at the molding stage. It is better to obtain fast curing rates by the addition of a latent curing catalyst to the resins. It should be noted, however, that the ammonium salts of various acids which are often used as curing catalysts for amino resins, such as urea resins and melamine resins, cause yellowish discoloration of the resins of the present invention after curing.

We have discovered latent catalysts which accelerate the curing rate of the latter resins at the molding step while causing substantially no discoloration. These catalysts are salts, other than ammonium salts, of various acids. The preferred catalysts are the phthalates and toluene sulphonates of zinc, magnesium, aluminum, melamine and guanidine; they may be added to the resin when the latter is in the liquid or solid state.

The following examples illustrate certain specific embodiments of the present invention.

*Example 1*

The mixed solution of 12.6 kg. of melamine, 9.4 kg. of phenol and the 21.1 kg. of 37% formalin was prepared and the pH of said solution was adjusted to 6.5 by addition of 2 N NaOH aqua.

The temperature of said solution was raised gradually and maintained at 90° C. for 30 minutes. Then the temperature was further increased and reaction proceeded at the reflux temperature of 95–98° C. for two hours. The pH of the thus obtained resin solution was 6.8 and said solution became hydrophobic after cooling down to 40° C. Leaving said solution for several hours, it separated into two layers, an upper water layer and a lower layer of resin suspension. This resin solution was taken out and used as raw material of resins after dilution with methanol. This resin solution was colorless and transparent and no discoloration, hydrophobe nor gelation occurred after a month.

20 g. of resin syrup, i.e., the reaction mixture obtained before separation into two layers was cured by heating in an evaporating dish at 160° C. for 30 minutes and yielded 13.6 g. of resin. This resin was also colorless and transparent, and no discoloration occurred after 3 months.

A further ten kilograms of the homogeneous resin syrup was kneaded with 2.8 kg. of α-cellulose pulp and dried at 80° C. 5 kg. of the dried product and 25 g. of zinc stearate, as a lubricant, were pulverized together in a ball mill and then used as a molding composition. Molded articles made from this composition were substantially colorless and had not discolored after 3 months. Further, the physical and chemical properties of the molded articles, such as alkali resistance, electric arc resistance, abrasion hardness and weather resistance, were better than those of previously known phenolic resins and were as good as those of melamine resins.

Further portions of the dried resin α-cellulose pulp mixture were taken and each was mixed with a pigment, such as titanium dioxide, cobalt blue, cobalt green, cadmium yellow, cadmium red and iron oxide and then pulverized with a lubricant as described above. Articles were produced from these compositions by molding under a pressure of 200 kg./cm.$^2$ at 160° C. and had the desired colors. The physical and chemical properties were as good as those of the colorless articles.

*Example 2*

A mixture of 16.2 kg. of 37% formalin and 12.6 kg. melamine was brought to pH 8 by adding 10% aqueous $Na_2CO_3$ and was heated to 90° C. as quickly as possible to dissolve the melamine and then maintained at that temperature for 30 minutes.

Then 9.4 kg. of phenol was added and after pH of this solution was adjusted to 6.5 by 10% $Na_2CO_3$ aqua, the reaction proceeded at the reflux temperature of 95 to 98° C. for 70 minutes. A further 4.9 kg. of formalin wherein the pH was adjusted to 6 by 10% $Na_2CO_3$ aqua was added and submitted to reaction for 10 minutes with enough agitation. After leaving it still this solution was separated so as to form two layers. Solution obtained by dilution of lower layer with methanol was colorless and transparent, and no discoloration, hydrophobe nor gelation occurred after a month.

Resin syrup gained after reaction was cured by the same method as described in Example 1 and rigid resin thus obtained was colorless and did not discolor after 3 months.

*Example 3*

Molding compositions obtained by the method described in Example 1 except for the pH of the reaction system, which was varied between 4 to 10, were tested for flow as follows. Five grams of each sample were placed in the form of a cone on the flat surface of a metal disk, 15 mm. in thickness, 150 mm. in diameter and maintained at a constant temperature of 160±3° C. and another disk of the same shape was piled on the sample within 15 seconds and was pressed and molded for one minute under the weight of 2500 kg. The average value of the long and short diameters of the sample were taken as a measure of flow. The results of the tests are shown in Table 1. For practical purposes a flow larger than 50 mm. is necessary.

TABLE 1.—RESULTS OF FLOW TESTS

| pH of resin solution | 4 | 5 | 6 | 6.5 | 7 | 7.5 | 8 | 9 | 10. |
|---|---|---|---|---|---|---|---|---|---|
| Color of resin solution. | | | | Colorless | | | | | |
| Flow (mm.) | 15 | 30 | 50 | 80 | 90 | 90 | 100 | 110 | 150. |
| Color of molded article. | White | Slightly white. | | Colorless | | | Pale yellow. | Pale brown. | Brown. |
| Clarity of molded article. | Opaque | Slightly opaque. | | | Transparent | | | | |

*Example 4*

The pH of a mixture of 12.6 kg. of melamine, 9.4 kg. of phenol and 24.3 kg. of 37% formalin was adjusted to 7.5 by the addition of magnesium hydroxide and the temperature of the solution was raised gradually and maintained at 90° C. for 90 minutes.

The resulting resin syrup had a pH of 7.2 and the resin separated out on cooling to 30° C. Twenty grams of the homogeneous resin syrup was cured by heating at 160° C. for 30 minutes in an evaporating dish and yielded 11.8 g. of solid resin, which was colorless and transparent and had not discolored after 3 months.

Example 5

16.2 kg. of 37% formalin, brought to pH 6.5 by adding zinc oxide, was added to 12.6 kg. of melamine and the temperature of the mixture was raised to 90° C. as quickly as possible to dissolve the melamine. 9.4 kg. of phenol was then added, the pH of the resulting solution was adjusted to 7.3 by adding zinc oxide and the solution was heated at 90° C. for 70 minutes. A further 4.9 kg. of 37% formalin of pH 4 was added and heating continued for 10 minutes with agitation. The resulting resin syrup had a pH of 6.9. 20 g. of this resin syrup was heated at 160° for 30 minutes in an evaporating dish to yield 11.5 g. of solid resin. The solid resin was colorless and transparent and had not discolored after 3 months.

Example 6

12.6 kg. of melamine, 11.8 kg. of a mixture of phenol and cresols (phenol 42.2%, m- and p-cresol 43.3%, o-cresol 12.5%, xylenol 1.1% and others 9.8%) and 31.6 kg. 37% formalin were mixed, the pH of the resulting solution was adjusted to 7.3 by adding 2 N NaOH and the temperature was raised gradually and maintained at 90° C. for 30 minutes. The solution was then heated at the reflux temperature of 95°–98° C. for a further 30 minutes.

The resulting resin syrup, having a pH of 7.2, was almost colorless and transparent and little discoloration had occurred after a month. The resin obtained by curing a portion of the resin syrup at 160° C. for 30 minutes was colored slightly pink, but had not discolored further after 3 months.

Ten kilograms of resin syrup, taken immediately after completion of the reaction, were mixed with 2.8 kg. of α-cellulose pulp and dried at 80° C. 0.5 wt. percent of zinc stearate was added to the dry material as a lubricant and the resulting composition was ground in a ball mill to provide a molding composition.

Molded articles prepared from this molding composition were colored slightly pink. Their weather resistance was tested by a weather meter for 216 hours and, although slight discoloration was observed, the appearance of the articles was not spoiled.

Example 7

The pH of a slurry containing 12.6 kg. of melamine, 9.4 kg. of phenol and 16.2 kg. of 37% formalin was adjusted to 7.0 by the addition of magnesium hydroxide. After heating the slurry at 90° C. for 90 minutes, a further 5.0 kg. of 37% formalin of pH 4.0 was added and heating was continued for a further 20 minutes. Ten kilograms of the resulting resin syrup were mixed with 3.0 kg. of bleached α-cellulose pulp and then dried. A molding composition was obtained by grinding the dried composition in a ball mill with 0.9 kg. of paratoluenesulphonamide and 0.5 wt. percent of zinc stearate as a lubricant. A molding composition without added paratoluenesulphonamide was similarly prepared from another portion of the resin syrup. The two molding compositions were tested for flow and compared by the disc method described in Example 3. The flow of the first composition was 110 mm. and that of the second was 75 mm.; both molding compositions were colorless.

Example 8

0.9 kg. of paratoluenesulphonamide was added to 10 kg. of a resin syrup prepared as described in Example 7 and the mixture was heated at 70° C. for 20 minutes. The flow of a molding composition prepared by mixing the mixture with α-cellulose pulp, drying and grinding with zinc stearate as described above, was 118 mm. and molded articles made from this molding composition were colorless.

Example 9

A molding composition was prepared by the method of Example 8 except that benzenesulphonamide was used instead of toluenesulphonamide. The flow was 112 mm. and molded articles made from the composition were colorless.

Example 10

65 g. of zinc paratoluenesulphonate were added as a latent curing catalyst to 10 kg. of a resin syrup prepared by the method of Example 5. The pH of the mixture was 6.5.

The mixture was heated at 140° C. for 30 minutes and yielded thoroughly cured, colorless, transparent solid resin. By way of comparison, when the syrup without the catalyst was heated at 140° C. for 30 minutes, a partially cured resin was obtained. In a further experiment, the syrup was mixed with ammonium chloride as the curing catalyst, and was cured under the same conditions. A completely cured solid resin was obtained, but it was colored yellow.

Example 11

A molding composition was prepared by mixing 10 kg. of resin syrup prepared by the method of Example 5 with 3 kg. of α-cellulose pulp, 30 g. of melamine paratoluenesulphonate, as latent curing catalyst, and zinc stearate, as a lubricant, and then drying the mixture. The composition had almost the same flow during molding as a similar composition prepared without the catalyst and had a faster curing rate than the latter.

The curing rate was estimated as the time required for the molded articles to set to a Shore hardness greater than 99 under a pressure of 200 kg./cm.$^2$ at 155° C. The rates were 2.3 minutes for the composition containing the catalyst and 3 minutes for the composition without the catalyst. Both solid resins were colorless.

A similar molding composition containing ammonium paratoluenesulphonate, instead of melamine paratoluenesulphonate, had a curing rate of the same order, but was colored yellow.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What we claim is:

1. A method of manufacturing substantially colorless modified phenolic resins by the condensation of phenols, melamine and formaldehyde, the order of the mixing of these reactants being such that the melamine is first mixed with at least one of the other reactants, wherein the mole ratio of the melamine to phenol is from 0.5 to 1.0 and the mole ratio of the formaldehyde to the total of the melamine and phenol is from 1.0 to 1.5, the pH of the reaction mixture is adjusted to between 5.0 to 8 after the addition of the phenols thereto by a pH controlling agent selected from a group consisting of NaOH, KOH, $Na_2CO_3$, $K_2CO_3$, $Ca(OH)_2$, ZnO, $Mg(OH)_2$ and $TiO_2$, and said reaction mixture is heated at an elevated temperature of between about 90 to about 98° C. for a time sufficient to complete the condensation reaction.

2. The method according to claim 1 wherein the reactants are reacted simultaneously.

3. The method according to claim 1 wherein the melamine is reacted with the phenols before the addition of the formaldehyde.

4. The method according to claim 1 wherein the melamine is reacted with the formaldehyde before the addition of the phenols.

5. A method of manufacturing melamine modified phenolic resins colored as desired by adding adequate dyes or pigments in any step of the process as claimed in claim 1.

6. A method according to claim 1 wherein benzenesulphonamide is added as a plasticizer at any stage in the process.

References Cited

UNITED STATES PATENTS

| | | | |
|---|---|---|---|
| 2,319,142 | 5/1943 | Lebach | 260—59 |
| 2,331,744 | 10/1943 | Swain et al. | 260—51.5 |
| 2,338,430 | 1/1944 | Habraschka | 260—59 |
| 3,036,028 | 5/1962 | Malashevitz | 260—51.5 |
| 3,070,572 | 12/1962 | Oland et al. | 260—51.5 |

FOREIGN PATENTS 132,441  5/1939  Australia.

OTHER REFERENCES

Martin: "The Chemistry of Phenolic Resins," John Wiley & Sons, Inc., New York, 1956, p. 150.

Monsanto Chemicals, "Plasticizers and Resins," 1940, pp. 4, 12 and 13.

MORRIS LIEBMAN, *Primary Examiner.*

B. A. AMERNICK, *Assistant Examiner.*